US012263469B2

(12) United States Patent
Wang et al.

(10) Patent No.: US 12,263,469 B2
(45) Date of Patent: Apr. 1, 2025

(54) METHODS FOR PRODUCING PHOTOCATALYST

(71) Applicant: Chung Yuan Christian University, Taoyuan (TW)

(72) Inventors: Ya-Fen Wang, Taoyuan (TW); Sheng-Jie You, Taoyuan (TW); Christianson Raynard Sanito, Taoyuan (TW)

(73) Assignee: Chung Yuan Christian University, Taoyuan (TW)

( * ) Notice: Subject to any disclaimer, the term of this patent is extended or adjusted under 35 U.S.C. 154(b) by 0 days.

(21) Appl. No.: 18/542,700

(22) Filed: Dec. 17, 2023

(65) Prior Publication Data

US 2024/0116034 A1 Apr. 11, 2024

Related U.S. Application Data

(62) Division of application No. 17/686,436, filed on Mar. 4, 2022, now Pat. No. 11,896,957.

(51) Int. Cl.
| | |
|---|---|
| *B01J 23/06* | (2006.01) |
| *B01J 21/06* | (2006.01) |
| *B01J 35/39* | (2024.01) |
| *B01J 37/04* | (2006.01) |
| *B01J 37/08* | (2006.01) |

(52) U.S. Cl.
CPC ............. *B01J 23/06* (2013.01); *B01J 21/063* (2013.01); *B01J 35/39* (2024.01); *B01J 37/04* (2013.01); *B01J 37/082* (2013.01)

(58) Field of Classification Search
CPC ........ B01J 37/08; B01J 20/3078; B01J 23/06; B01J 21/063; B01J 35/004; B01J 37/04; B01J 37/082; B01J 35/39
USPC .............................................. 423/304, 239.1
See application file for complete search history.

(56) References Cited

U.S. PATENT DOCUMENTS

2007/0215006 A1* 9/2007 Naganuma ............. C01G 23/00
502/208

FOREIGN PATENT DOCUMENTS

CN 113941324 A * 1/2022

OTHER PUBLICATIONS

RAC: Is my car bad for the environment? A guide to vehicle exhaust emissions [online], [retrieved on Aug. 10, 2023]. Retrieved from the internet: < URL: https://www.rac.co.uk/drive/advice/emissions/vehicle-exhaust-emissions-what-comes-out-of-your-cars-exhaust/> (Year: 2023).*

(Continued)

*Primary Examiner* — Colin W. Slifka
*Assistant Examiner* — Ritu S Shirali
(74) *Attorney, Agent, or Firm* — NZ Carr Law Office

(57) ABSTRACT

Disclosed herein are methods of producing photocatalysts for degrading NOx. According to some embodiments of the present disclosure, the method comprises mixing a transitional metal or its oxide with a bone powder or a shell powder, followed by heating the mixture for at least 12 hours to dehydrate the mixture, and calcinating the dehydrated product for 1-5 hours. In certain embodiments, the bone powder is mixed with titanium dioxide at the weight ratio of 1:1. In certain embodiments, the shell powder is mixed with titanium dioxide at the weight ratio of 0.5:1 to 2:1 (w/w).

9 Claims, 1 Drawing Sheet

(56) References Cited

OTHER PUBLICATIONS

Tram et al., Characterization of carbonate apatite derived from chicken bone and its in-vitro evaluation using MC3T3-E1 cells, 2021, Material Research Express, 8, 025401 (Year: 2021).*
Machine translation of CN 113941324 A originally published Jan. 2022 to Zhang et al. (Year: 2022).*
Giannakopoulou et al., Composite hydroxyapatite/TiO2 materials for photocatalytic oxidation of NOx, 2012, Materials Science and Engineering B, 177, 1046-1052 (Year: 2012).*

* cited by examiner

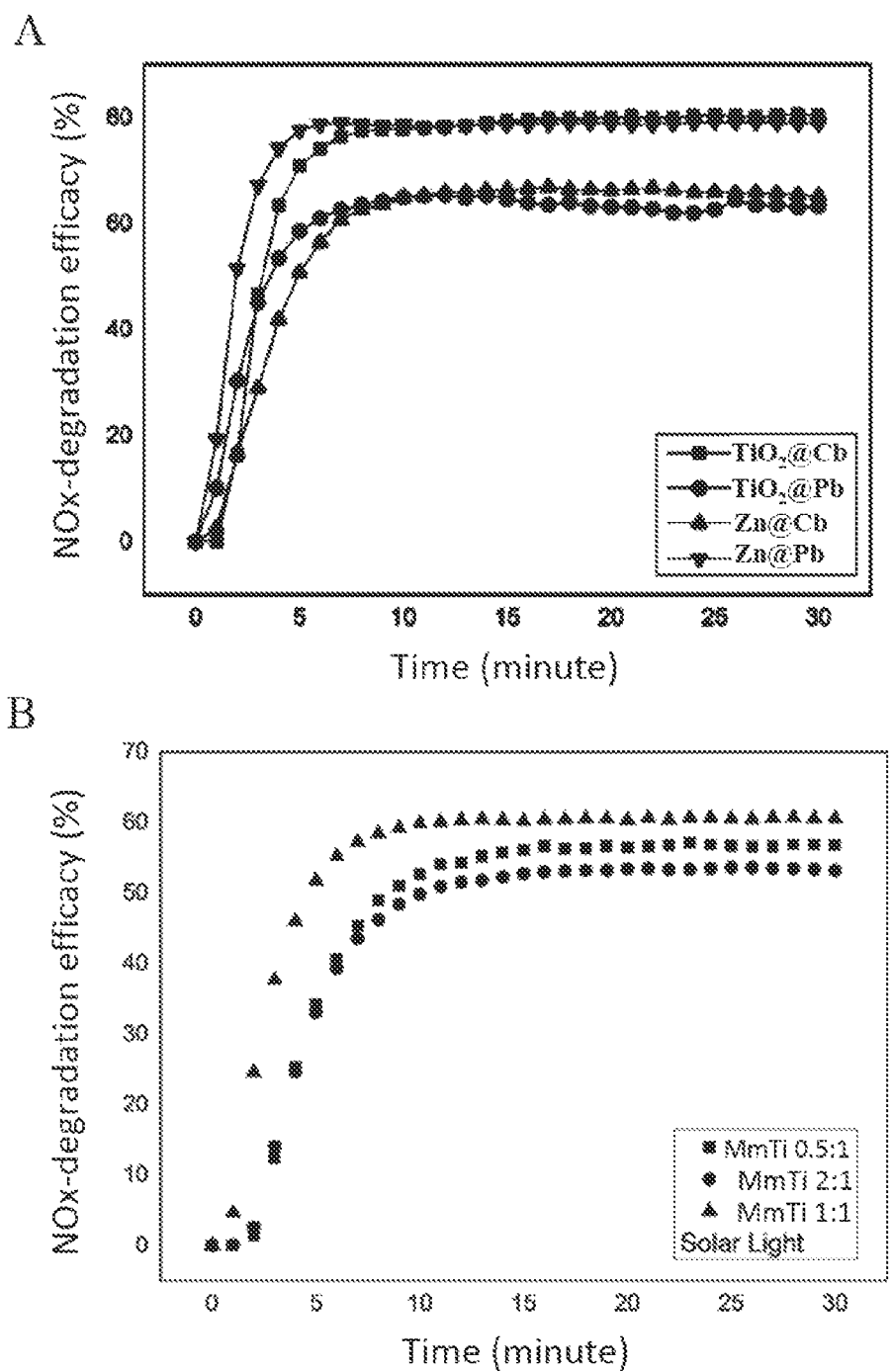

METHODS FOR PRODUCING PHOTOCATALYST

CROSS-REFERENCE TO RELATED APPLICATION

This application is a divisional application of U.S. application Ser. No. 17/686,436, filed Mar. 4, 2022, and published on Sep. 7, 2023. The content of the application is incorporated herein by reference in its entirety.

BACKGROUND OF THE INVENTION

1. Field of the Invention

The present disclosure in general relates to photocatalysts, more particularly, methods of producing photocatalysts from bone powders or shell powders, and their uses in degrading air pollutants, such as nitrogen oxides.

2. Description of Related Art

Nitrogen oxides (NOx) represent a family of compounds that are recognized as major pollutants from fuel combustion, and may be found in different forms, such as nitric oxide (NO), nitric dioxide ($NO_2$), dinitrogen trioxide ($N_2O_3$), nitrous oxide ($N_2O$), and the like. These pollutants decrease air quality and threaten human health. It is known that low levels of NOx would irritate eyes, nose, throat and lung that leads to coughing, shortness of breath, tiredness and nausea, and breathing high levels of NOx would cause rapid burning, spasms and swelling of tissues in the throat and upper respiratory tract, reduced oxygenation of tissues, fluid accumulation in the lungs, and even death.

Photocatalysts have been used to address the NOx problem. However, most of the photocatalysts are only responsive to ultraviolet (UV) light, which occupies only about 4% of the solar spectrum. Although there are several reports of visible light driven photocatalysts, yet the photocatalytic efficacy of such photocatalysts is too low for any practical uses. It has been reported that doping the photocatalysts with metal or non-metal ions may improve the photocatalytic efficacy. Nonetheless, the doping procedure is time-consuming, and would significantly increase the cost of manufacturing.

In view of the foregoing, there exists in the related art a need for an economically efficient method for producing a photocatalyst that is able to efficiently degrade air pollutants, especially NOx.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, the present disclosure aims at providing a novel photocatalyst for degrading nitrogen oxides (NOx). According to certain embodiments of the present disclosure, the NOx may be NO, $NO_2$, $N_2O_3$, $N_2O$, or a combination thereof. According to certain exemplary embodiments, the NOx is a mixture of NO and $NO_2$.

The first aspect of the present disclosure is thus directed to a method of producing a photocatalyst for degrading NOx. According to some embodiments of the present disclosure, the method comprises, a) mixing a transitional metal or an oxide thereof with a solvent at a ratio of 1:10 (w/v) to produce a first mixture;

(b) mixing a bone powder or a shell powder with the first mixture of step (a) to produce a second mixture, in which the bone powder or the shell powder and the transitional metal or the oxide thereof are present in the second mixture at a weight ratio of 0.1:1 to 10:1 (w/w);

(c) heating the second mixture of step (b) to produce a dehydrated product; and (d) calcinating the dehydrated product of step (c) to produce the photocatalyst.

According to some embodiments, the transitional metal is titanium or zinc.

According to certain embodiments of the present disclosure, in the step (b), the bone powder is mixed with titanium dioxide at the weight ratio of 1:1. According to other embodiments, in the step (b), the shell powder is mixed with titanium dioxide at the weight ratio of 0.5:1-2:1.

According to some embodiments, in the step (c), the second mixture of step (b) is heated at 100° C. for at least 12 hours.

According to certain embodiments of the present disclosure, in the step (d), the dehydrated product of step (c) is calcinated at 400-1,150° C. for 1-5 hours. According to certain preferred embodiments, the dehydrated product is calcinated at 400-500° C. for 2 hours.

According to some embodiments of the present disclosure, the bone powder is produced by pulverizing bones of a chicken, a duck, a pig, a cow, a sheep, a donkey, or a horse. Preferably, the bone powder is derived from the bones of the chicken or the pig. In other embodiments of the present disclosure, the shell powder is produced by pulverizing shells of a shrimp, a crab, a clam, a barnacle, a snail, an abalone, or an oyster. According to certain exemplary embodiments, the shell powder is derived from the shell of the clam.

Alternatively or optionally, the method may further comprise a step of calcinating the bone powder or the shell powder at 400-500° C. for 1-5 hours prior to step (b).

In another aspect, the present disclosure is directed to a method of degrading NOx in a sample. The method comprises, (i) mixing the sample with the photocatalyst produced by the method of present disclosure, and (ii) irradiating the mixture of step (i) with solar light or visible light for at least 5 minutes.

According to some embodiments of the present disclosure, the step (ii) is carried out at a humidity of 30-70%. In certain preferred embodiments, the step (ii) is carried out at a humidity of 40%.

According to certain embodiments, after the step (ii), the NOx in the sample is degraded to a level of no more than 1.8 parts per million (ppm). According to some working examples, the NOx in the sample is degraded to a level of no more than 500 parts per billion (ppb).

The details of one or more embodiments of the invention are set forth in the accompanying description below. Other features and advantages of the invention will be apparent from the detail descriptions, and from claims.

BRIEF DESCRIPTION OF THE DRAWINGS

The present description will be better understood from the following detailed description read in light of the accompanying drawings, where:

FIG. 1 is a line chart depicting the degradation of NOx by the present photocatalysts according to Example 2.2 of the present disclosure. The NOx-degrading efficacy of ZnO@Pb, ZnO@Cb, TiO$_2$@Pb, and TiO$_2$@Cb were depicted in panel A, and the NOx-degrading efficacy of MmTi 2:1 (shell powder doped with TiO$_2$ at a weight ratio of 2:1), MmTi 1:1 (shell powder doped with TiO$_2$ at a weight ratio of 1:1), and MmTi 0.5:1 (shell powder doped with TiO$_2$ at a weight ratio of 0.5:1) were depicted in panel B.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

I. Definitions

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Also, unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about". Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques.

The term "photocatalyst" as used herein refers to a material that accelerates photoreactions without being consumed in the process. In the present disclosure, the photoreaction is activated by solar or visible light via a redox reaction occurred on the surface of the photocatalyst.

The term "nitrogen oxide" (NOx) as used herein refers to a binary compound of oxygen and nitrogen, or a mixture of such compounds. Examples of NOx include, but are not limited to, nitric oxide (NO), nitric dioxide (NO$_2$), nitric trioxide (NO$_3$), nitrous oxide (N$_2$O), dinitrogen dioxide (N$_2$O$_2$) and the like. As used herein, the term "nitrogen oxides" is intended to describe a mixture of NO and NO$_2$, which are gases produced from natural sources, motor vehicles, and other fuel combustion processes.

The term "solar light" as used herein refers to all of the electromagnetic radiation that comes from the sun. The spectrum of electromagnetic radiation of the sun spans from 100 nm to 1 mm. Accordingly, the term "solar light" as used herein refers to any source of light that provides the same or similar spectrum of the sun. The spectrum can be divided into three regions, including UV light (100 nm-400 nm), visible (400 nm-700 nm), and infrared (700 nm-1 mm). The UV may further classify into UVA (315 nm-400 nm), UVB (280 nm-315 nm), and UVC (100 nm-280 nm).

The term "calcination" as used herein refers to a process of heating a solid at a high temperature with none or limited supply of oxygen to remove impurities and/or volatile substances therein and/or to induce thermal decomposition. The reaction in general, is conducted at a temperature between 550-1,150 degree Celsius (° C.) or 1,000-2,100 degree Fahrenheit (° F.) with a controlled amount of air.

The term "transitional metal" as used herein refers to an element that has a partially filled d sub-shell, or which can give rise to cations with incomplete d sub-shell. Transitional metals are characterized by their ability to exhibit more than one oxidation state and their ability to adopt multiple oxidation states is the main reason for their potential to decompose organic compounds.

The term "bone powder" as used herein refers to any powder of bones. According to embodiments of the present disclosure, the bone powder is produced by pulverizing bones derived from an animal, especially from an economic animal, such as a pig, a chicken, a donkey, a cow, a sheep, a horse, a dog, a cat, a rabbit, or a camel. According to certain embodiments of the present disclosure, the bone powders are derived from a chicken bone or a pig bone.

The term "shell powder" as used herein refers to any powder of shells. According to embodiments of the present disclosure, the shell powder is produced by pulverizing shells of any animal that have a shell including, but are not limited to, a mollusk, a crustacean, a turtle, a tortoise, and an echinodermata. Exemplary species of the animal may be a shrimp, a crab, a clam, a barnacle, a snail, an abalone, a mussel, and an oyster. According to one exemplary embodiment of the present disclosure, the shell powder is derived from the shell of the clam.

II. Description of the Invention

The present disclosure aims at providing an economically efficient method for producing photocatalysts. Compared to traditional methods, which include complex photochemical processes and being expensive and time-consuming, the present method is characterized by using bone powders (e.g., powders derived from animal bone), shell powders (e.g. powders derived from shells of clams) and transitional metal as the reactants, and the entire process is relatively simple as only heating and calcinating steps are required, thereby greatly reduces the cost of producing the catalysts.

Accordingly, the first aspect of the present disclosure is directed to a method of producing a photocatalyst, which is useful for degrading environmental NOx. The method comprises, (a) mixing a transitional metal or its oxide with a solvent to produce a first mixture, (b) mixing a bone powder or a shell powder with the first mixture to produce a second mixture, (c) heating the second mixture to produce a dehydrated product, and (d) calcinating the dehydrated product to produce the photocatalyst.

In the step (a), the transitional metal or its oxide is mixed with a solvent at a ratio of 1:10 (w/v) to produce a first mixture. According to certain embodiments, the solvent may be any solvent known in the art for homogeneously suspending materials (e.g. bone powder, shell powder and transitional metal or its oxide). The solvent suitable for use in the present method may be an alcohol (e.g. methanol, ethanol, propanol, and butanol), or water. According to some working examples, the solvent is water.

Then, in the step (b), the bone powder or the shell powder is mixed with the first mixture of step (a) to produce a second mixture. In the second mixture, the bone powder and the transitional metal or its oxide are mixed at a weight ratio of 0.1:1 to 10:1 (w/w); for example, at a weight ratio of 0.1:1, 0.2:1, 0.3:1, 0.4:1, 0.5:1, 0.6:1, 0.7:1, 0.8:1, 0.9:1, 1:1, 1.5:1, 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, or 10:1 (w/w). According to preferred embodiments, the bone powder is mixed with the transitional metal or its oxide at a weight ratio of 1:1 (w/w).

According to other embodiments, in the second mixture, the shell powder and the transitional metal or its oxide are mixed at a weight ratio of 0.1:1, 0.2:1, 0.3:1, 0.4:1, 0.5:1, 0.6:1, 0.7:1, 0.8:1, 0.9:1, 1:1, 1.5:1, 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, or 10:1 (w/w). According to certain preferred embodiments, the shell powder is mixed with the transitional metal or its oxide at a weight ratio of 0.5:1 to 2:1 (w/w). According to some working examples, the shell powder is mixed with the transitional metal or its oxide at the weight ratio of 0.5:1, 1:1, or 2:1 (w/w).

Preferably, the transitional metal or its oxide and the bone powder or the shell powder are added to the solvent followed by stirring at room temperature for at least 4 hours (e.g., stirring for 4, 4.5, 5, 5.5, 6, 6.5, 7, 7.5, 8, 8.5, 9, 9.5, 10, 10.5, 11, 11.5 or 12 hours, or longer) so as to allow the reactants (i.e., the transitional metal or its oxide and the bone powder or the shell powder) distributed homogeneously in the solution. According to certain example of the present disclosure, the mixture of the reactants is stirred for 4 hours.

According to some embodiments of the present disclosure, the bone powder is produced by pulverizing bones of animals, especially economic animals, such as a chicken, a duck, a pig, a cow, a sheep, a donkey, a horse, a rabbit, or a goose. Preferably, the bone powder is produced by pulverizing bones of a chicken or a pig.

According to other embodiments, the shell powder is produced by pulverizing shells of a shrimp, a crab, a clam, a barnacle, a snail, an abalone, a top shell, or an oyster. Preferably, the shell powder is produced by pulverizing shells of the clam, more specifically, the shell powder is derived from shells of *Meretrix meretrix*.

Examples of transitional metal and its oxide suitable for use in the present disclosure include, but are not limited to, scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), silver (Ag), hafnium (Hf), tantalum (Ta), tungsten (W), platinum (Pt), titanium dioxide ($TiO_2$), titanium oxide ($TiO_3$), zinc oxide (ZnO), tungsten oxide ($WO_3$), zirconium dioxide ($ZrO_2$), ferric oxide ($Fe_2O_3$), strontium titanate ($SrTiO_3$), silicon dioxide ($SiO_2$). According to one embodiment of the present disclosure, $TiO_2$ is mixed with the bone powder of a chicken, and the thus-obtained photocatalyst is designated as "$TiO_2$@Cb". According to another embodiment, $TiO_2$ is mixed with the bone powder of a pig, and the thus-obtained photocatalyst is designated as "$TiO_2$@Pb". According to still another embodiment, ZnO is mixed with the bone powder of a chicken, and the thus-obtained photocatalyst is designated as "ZnO@Cb". According to further another embodiment, ZnO is mixed with the bone powder of a pig, and the thus-obtained photocatalyst is designated as "ZnO@Pb". According to further another embodiment, $TiO_2$ may be mixed with the shell powder of a *Meretrix meretrix*, and the thus-obtained photocatalyst is designated as MmTi.

Alternatively or optionally, prior to step (b), the bone powder and the shell powder may be calcinated at 400-500° C. for 1, 1.5, 2, 2.5, 3, 3.5, 4, 4.5, or 5 hours so as to remove any volatile substances therein.

Next, in the step (c), the second mixture of step (b) is dried to produce a dehydrated product via heating the second mixture at 100° C. for at least 12 hours, for example, heating for 12, 13, 14, 15, 16, 17, 18, 19, 20, 21, 22, 23 or 24 hours, or longer. According to some embodiments, the second mixture of step (b) is heated at 100° C. for 12 hours so as to produce the dehydrated product. As could be appreciated, the dehydration step may alternatively be carried out by other drying techniques known by a skilled artisan; for example, lyophilization, supercritical drying, spray drying, azeotropic drying, adiabatic drying, microwave drying, vacuum drying, or a combination thereof.

Then, in the step (d), the dehydrated product produced in step (c) is calcinated at a temperature about 400-1,150° C. for a period of time; for example, the dehydrated product may be calcinated at 400, 405, 410, 415, 420, 425, 430, 435, 440, 445, 450, 455, 460, 465, 470, 475, 480, 485, 490, 495, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1,000, 1,010, 1,020, 1,030, 1,040, 1,050, 1,060, 1,070, 1,080, 1,090, 1,100, 1,110, 1,120, 1,130, 1,140, or 1,150° C. for 1-5 hours (e.g., 1, 1.5, 2, 2.5, 3, 3.5, 4, 4.5, or 5 hours). According to certain preferred embodiments, the dehydrated product is calcinated at 400-500° C. for 2 hours.

Another aspect of the present disclosure is directed to a method to degrade NOx in a sample by using the thus-produced photocatalyst. The method comprises, (i) mixing the sample with the thus-produced photocatalyst, and (ii) irradiating the mixture with solar light or visible light for at least 5 minutes.

According to certain embodiments of the present disclosure, the light source may be natural light or any source that can provide a similar spectrum of solar light or visible light, including, deuterium lamp, xenon lamp, pulsed xenon flash lamp, xenon halogen lamp, halogen lamp, laser, incandescent lamp, or light-emitting diode (LED) lamp. According to certain exemplary embodiments, the light source is a xenon lamp.

According to certain embodiments, the mixture is irradiated by solar light or visible light for at least 5 minutes. According to some preferred embodiments, the mixture is irradiated by solar light or visible light for 5-150 minutes (e.g. 5, 10, 15, 20, 25, 30, 35, 40, 45, 50, 55, 60, 65, 70, 75, 80, 85, 90, 95, 100, 105, 110, 115, 120, 125, 130, 135, 140, 145, or 150 minutes). In some examples of the present disclosure, irradiating the mixture for 5 minutes is sufficient to achieve the NOx-degrading effect.

According to certain embodiments of the present disclosure, the degrading process (i.e., step (ii)) is carried out at a humidity of 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70%. Preferably, the degrading process is carried out at a humidity of 40%.

According to some embodiments, the NOx in the sample is degraded to a level no more than 1.8 parts per million (ppm) after stop irradiating the mixture. According to certain embodiments, the NOx in the sample is degraded to a level no more than 500 parts per billion (ppb).

EXAMPLES

Example 1 Synthesis of the Present Photocatalysts

Chicken bones, pig bones were collected from restaurants and/or manufacturing wastes and cleaned to remove any remains other than bones. The bones were then heated at 100° C. for at least 24 hours, followed by transferring into a pulverizing machine to produce a bone powder. The bone powder was then calcinated at 400° C.-500° C. for at least 2 hours in a muffle furnace. Additionally, shells were applied for the same process described above to produce a shell powder.

For the purpose of producing the present photocatalyst, 3 g of $TiO_2$ or $Zn(NO_3)_2$ was diluted in 30 mL deionized water and stirred for at least 30 minutes. Then, the solution was mixed with the bone powder (derived from chicken bones or pig bones) or the shell powder (derived from shells), in which the $TiO_2$ or $Zn(NO_3)_2$ and the bone powder were present in the solution at a ratio of 1:1 (w/w), or the shell powder were present in the solution at a ratio of 1:1, 1:2, or 2:1 (w/w). The thus-produced mixture was then thoroughly mixed for 4 hours.

Next, the mixture was heated at 100° C. for 12 hours, and followed by calcinating at 400-450° C. for 2 hours. The thus-obtained photocatalysts were respectively designated as ZnO@Cb (i.e., ZnO doped with the bone powder of a chicken), ZnO@Pb (i.e., ZnO doped with the bone powder of a pig), $TiO_2$@Cb (i.e., $TiO_2$ doped with the bone powder of a chicken), $TiO_2$@Pb (i.e., $TiO_2$ doped with the bone powder of a pig), and MmTi 2:1, MmTi 1:1, and MmTi 0.5:1 (i.e., the shell powder derived from *Meretrix meretrix* species is doped with $TiO_2$ at a ratio of 2:1, 1:1, and 0.5:1 (w/w), respectively).

Example 2 Characterization of the Present Photocatalysts

The structure, efficacy and reusability of the photocatalysts produced in Example 1, including ZnO@ Cb, ZnO@ Pb, $TiO_2$@Cb, $TiO_2$@Pb, and MmTi were examined in this example.

2.1 Structure of the Present Photocatalysts

The crystalline structures of the photocatalysts, including ZnO@ Cb, ZnO@ Pb, $TiO_2$@Cb, and $TiO_2$@Pb, were analyzed by X-ray diffraction (XRD). According to the results, the crystalline structures of ZnO@ Cb or ZnO@ Pb mainly consisted of hydroxyapatite, calcium oxide, ZnO, and calcium zinc oxide phosphate hydroxide (data not shown), and the crystalline structures of $TiO_2$@Cb or $TiO_2$@Pb mainly consisted of anatase and rutile (data not shown).

The morphology of each photocatalysts was further analyzed by scanning electron microscope-energy dispersive x-ray (SEM-EDX) and transmission electron microscope (TEM). The results indicated that each photocatalysts existed as a microcube, in which the particle sizes of ZnO@Cb or $TiO_2$@Cb were larger than those of ZnO@Pb or $TiO_2$@Pb, and the space between two particles of ZnO@Cb or $TiO_2$@Cb was boarder than that of ZnO@Pb or $TiO_2$@Pb (data now shown). The findings suggested that the photocatalysts doped with chicken bone powder was less rigid than that of the photocatalyst doped with pig bone powder.

2.2 Effect of the Present Photocatalysts on Degrading NOx

The effect of each photocatalysts produced in Example 1 in degrading NOx was examined in this example. To this purpose, each photocatalysts was mixed with a NOx gas containing NO and $NO_2$ (500 parts per billion (ppb), and 1800 part per million (ppm) for testing photocatalysts doped with bone powder (i.e., ZnO@Cb, ZnO@ Pb, $TiO_2$@Cb, and $TiO_2$@Pb), and 440 ppb for testing the photocatalysts doped with shell powder (i.e., MmTi 1:1, MmTi 0.5:1, and MmTi 2:1)), the mixture was irradiated with solar light at a humidity of 40% for 30 minutes. Then, the concentration of NOx in the container was determined. The efficacy of the photocatalyst on degrading/removing NOx was determined by equation (I):

$$\text{NOx − degrading efficacy} = \left(1 - \frac{\text{the concentration of NOx after raction}}{\text{the concentration of NOx before raction}}\right) \times 100\% \quad (I)$$

The NOx-degrading efficacy of ZnO@Cb, ZnO@Pb, $TiO_2$@Cb, $TiO_2$@Pb, and MmTi are summarized in Table 1 and depicted in FIG. 1 (panels A and B), in which $TiO_2$@Pb exhibited the highest efficacy in degrading NOx, as compared to that of other photocatalysts doped with bone powder. Moreover, the NOx-degrading efficacy of MmTi is about 50%-60% and MmTi 1:1 exhibited the highest efficacy in degrading NOx compared to that of other photocatalysts doped with shell powder.

The effect of $TiO_2$@Cb or $TiO_2$@Pb in degrading NOx was further investigated in the NOx concentration of 1.8 ppm, in which each photocatalyst was irradiated with solar light and visible light. Results are summarized in Table 1.

According to Table 1, in the case when the catalytic mixtures of $TiO_2$@Pb and $TiO_2$@Cb were respectively irradiated with solar light, the degradation of NOx were 50%-60% and 20%-40%, respectively. In the case when the catalytic mixtures of $TiO_2$@Pb was irradiated with visible light, the degradation of NOx was about 70%, while that of $TiO_2$@Cb was negligible. Taken together, the results indicate that when $TiO_2$@Pb and $TiO_2$@Cb were irradiated by solar light, $TiO_2$@Pb may degrade 50%-60% of NOx, and $TiO_2$@Cb may degrade 20%-40% of NOx. Further, only $TiO_2$@Pb remained active in the degradation of NOx under visible light.

TABLE 1

NOx-degrading efficacy of the present photocatalysts

| Sample | NOx concentration | Light source | NOx-degrading efficacy |
|---|---|---|---|
| ZnO@Cb | 500 ppb | solar light | 56% |
| ZnO@Pb | 500 ppb | solar light | 79% |
| $TiO_2$@Cb | 500 ppb | solar light | 81% |
| $TiO_2$@Pb | 500 ppb | solar light | 63.3% |
| $TiO_2$@Cb | 1.8 ppm | solar light | 20%-40% |
| $TiO_2$@Pb | 1.8 ppm | solar light | 50%-60% |
| $TiO_2$@Cb | 1.8 ppm | visible light | Not work |
| $TiO_2$@Pb | 1.8 ppm | visible light | 70% |
| MmTi 0.5:1 | 440 ppb | solar light | 57% |
| MmTi 1:1 | 440 ppb | solar light | 53% |
| MmTi 2:1 | 440 ppb | solar light | 61% |

2.3 Reusability of the Present Photocatalysts

In this example, the reusability of the photocatalysts of Example 1, including ZnO@Cb, ZnO@Pb, $TiO_2$@Cb, and $TiO_2$@Pb, were examined by use of a recycling test. Specifically, the photocatalysts were mixed with NOx and the mixture was irradiated with solar light for 30 minutes (degradation reaction); the reacted photocatalysts were then washed with deionized water and dried by heating at 70° C. twice (retrieving reaction). The retrieved photocatalysts were then used as the photocatalytic materials in the second round of reaction. In sum, 5 rounds of the degradation and retrieving reactions were performed. The reusability of the photocatalysts was determined by analyzing the NOx-degrading efficacy in each round of reaction. Results are summarized in Table 2.

According to Table 2, all photocatalysts could degrade NOx. Compared to ZnO@Pb and ZnO@Cb, $TiO_2$@Pb and $TiO_2$@Cb exhibited great reusability during the recycling test, in which their ability in degrading NOx remained nearly unchanged after five rounds of reaction; while that of ZnO@Pb and ZnO@Cb decreased with each round of reactions.

TABLE 2

Reusability of the present photocatalysts

| Photocatalyst | NOx-degrading efficacy | | | | |
|---|---|---|---|---|---|
| | $1^{st}$ round | $2^{nd}$ round | $3^{rd}$ round | $4^{th}$ round | $5^{th}$ round |
| ZnO@Pb | 30% | 13% | 10% | 10% | 10% |
| ZnO@Cb | 70% | 60% | 55% | 50% | 60% |
| $TiO_2$@Pb | 100% | 100% | 100% | 100% | 100% |
| $TiO_2$@Cb | 100% | 100% | 100% | 100% | 100% |

In conclusion, the present disclosure provides a fast and economic method for producing photocatalysts for degrading NOx. According to embodiments of the present disclosure, the chicken bone powder, pig bone powder, and shell powder are promising dopants for $TiO_2$ or ZnO, accordingly, the photocatalysts may be produced by a simple and easy-to-use process, and at a reduced cost.

It will be understood that the above description of embodiments is given by way of example only and that various modifications may be made by those with ordinary skill in the art. The above specification, examples, and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method for producing a photocatalyst for degrading NOx, comprising,
    (a) mixing a transitional metal or an oxide thereof with a solvent at a ratio of 1:10 w/v to produce a first mixture;
    (b) mixing a bone powder or a shell powder with the first mixture of step (a) to produce a second mixture, in which the bone powder or the shell powder and the transitional metal or the oxide thereof are present in the second mixture at a weight ratio of 1:1 (w/w);
    (c) heating the second mixture of step (b) to produce a dehydrated product; and
    (d) calcinating the dehydrated product of step (c) to produce the photocatalyst.

2. The method of claim 1, wherein the transitional metal is titanium or zinc.

3. The method of claim 1, wherein in the step (c), the second mixture of the step (b) is heated at 100° C. for at least 12 hours.

4. The method of claim 1, wherein in the step (d), the dehydrated product of step (c) is calcinated at 400-1,150° C. for 1-5 hours.

5. The method of claim 4, wherein in the step (d), the dehydrated product of step (c) is calcinated at 400-500° C. for 2 hours.

6. The method of claim 1, further comprising calcinating the bone powder or shell powder at 400-500° C. for 1-5 hours prior to step (b).

7. The method of claim 1, wherein the bone powder is produced by pulverizing bones of a chicken, a duck, a pig, a cow, a sheep, a donkey, or a horse, and the shell powder is produced by pulverizing shells of a shrimp, a crab, a clam, a barnacle, a snail, an abalone, or an oyster.

8. The method of claim 7, wherein the bone powder is derived from the bones of the chicken or the pig.

9. The method of claim 7, wherein the shell powder is derived from the shells of the clam.

* * * * *